E. A. Field,
Fish Net,

N° 55,635.　　　　Patented June 19, 1866.

Witnesses;
Samuel N. Piper
George Andrews

Inventor;
Edward A. Field
by his attorney
R. N. Eddy

UNITED STATES PATENT OFFICE.

EDWARD A. FIELD, OF SIDNEY, MAINE.

IMPROVEMENT IN FISHING-NETS.

Specification forming part of Letters Patent No. 55,635, dated June 19, 1866.

*To all whom it may concern:*

Be it known that I, EDWARD A. FIELD, of Sidney, in the county of Kennebec and State of Maine, have invented an Improved Fishing Net or Apparatus; and I do hereby declare the same to be fully described in the following specification and represented in the accompanying drawings, of which—

Figure 2:
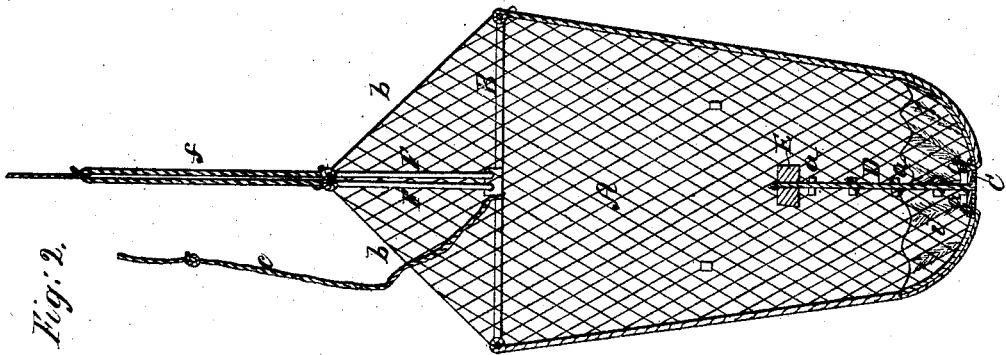
Figure 1:
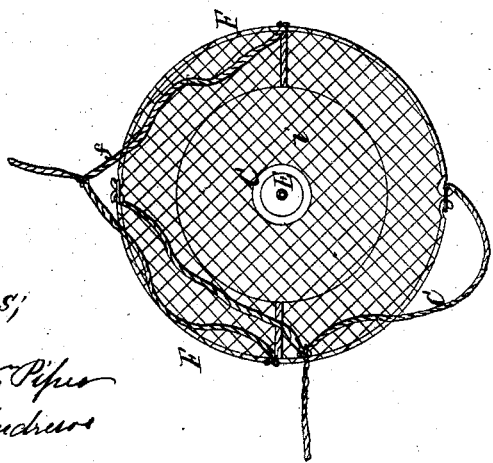

Figure 1 is a top view, and Fig. 2 a vertical section, of it.

The body A of the net is a bag made of netting or netted cord or thread, and suspended from a metallic hoop, B. At its lower end the net is provided with a weight or sinker, C, to which a bait-line, D, at one end, is fixed, such line having a float, E, applied to its other extremity. To this line, as well as to the sinker, pieces of bait *a a a* may be fastened preparatory to the net being set for taking fish.

The hoop B has two semi-hoops, F F, hinged to it, so as to enable them to be turned from parallelism with the hoop up into planes perpendicular thereto, or thereabout, so as to bring the two semi-hoops together. The net is also extended from the main hoop up to both of the semi-hoops, when they are raised up close together, the extensions *b b* of the netting, with the semi-hoops, constituting lips to the mouth of the net, or, in other words, a means of closing such mouth.

The net is to be suspended from a bail or rope, *c*, attached to the main hoop at opposite parts of it, a lowering-rope being secured to such bail when the net is in use.

Furthermore, there is to be a closing-rope, *f*, to the two semi-hoops, the same being fastened at its ends to the middles of both of them, and when the net is in use the closing-rope at its middle should have a lifting-rope attached to it.

To prevent the lower part of the net from becoming entangled in or on it by matters on the bottom of the water while the net may be thereon or in the act of being drawn away therefrom, the said lower part should have a disk or piece, *i*, of cloth or leather applied to its outside, such being what I term a "ground-guard."

In using the net so made it is to be lowered down so as to cause its sinker and main hoop to rest on the ground under the water containing the fish to be taken, the lips of the net being allowed to open, so as to enable the float to rise and draw up the bait-rope and bait attached to it.

When the fish may have gathered in sufficient quantity about the bait the net may be carefully drawn upward, so as to inclose them, after which the mouth of the net may be closed, so as to properly entrap them.

I claim as my invention—

The improved manufacture of fishing net or apparatus, made, substantially as described, with the sinker, the ground-guard, and the mouth-hoop, the lip-hoops, or the same and the bait-line and float, arranged and combined together and with netting, and so as to operate, substantially as specified.

EDWARD A. FIELD.

Witnesses:
R. H. EDDY,
F. P. HALE, Jr.